United States Patent
Robinson et al.

(10) Patent No.: US 12,451,021 B2
(45) Date of Patent: Oct. 21, 2025

(54) MICROSCALE WEATHER HAZARD PRODUCTS FOR URBAN AVIATION TRANSPORTATION

(71) Applicant: THE MITRE CORPORATION, McLean, VA (US)

(72) Inventors: Mike Robinson, Warrenton, VA (US); Victor E. Klimenko, Falls Church, VA (US)

(73) Assignee: THE MITRE CORPORATION, McLean, VA (US)

( * ) Notice: Subject to any disclaimer, the term of this patent is extended or adjusted under 35 U.S.C. 154(b) by 333 days.

(21) Appl. No.: 17/881,353

(22) Filed: Aug. 4, 2022

(65) Prior Publication Data
US 2024/0046804 A1  Feb. 8, 2024

(51) Int. Cl.
*G08G 5/76* (2025.01)
*G08G 5/32* (2025.01)
*G08G 5/55* (2025.01)
*G08G 5/57* (2025.01)

(52) U.S. Cl.
CPC ............ *G08G 5/76* (2025.01); *G08G 5/32* (2025.01); *G08G 5/55* (2025.01); *G08G 5/57* (2025.01)

(58) Field of Classification Search
None
See application file for complete search history.

(56) References Cited

U.S. PATENT DOCUMENTS

| | | |
|---|---|---|
| 5,958,979 A | 9/1999 | Lahr et al. |
| 6,190,696 B1 | 2/2001 | Groenewoud |
| 6,199,008 B1 * | 3/2001 | Aratow ............ G06T 11/206 701/14 |
| 6,399,101 B1 | 6/2002 | Frontanes et al. |

(Continued)

FOREIGN PATENT DOCUMENTS

| | | | |
|---|---|---|---|
| CN | 110457819 B | 11/2019 | |
| JP | 2022038675 A * | 3/2022 | ........... G08G 5/0013 |

OTHER PUBLICATIONS

Langelaan et al., "Wind Field Estimation for Small Unmanned Aerial Vehicles," AIAA Guidance, Navigation and Control Conference, American Institute of Aeronautics and Astronautics Paper No. 2010-8177, Aug. 2010; pp. 1-21.

*Primary Examiner* — Peter D Nolan
*Assistant Examiner* — Jacob Kent Besteman-Street
(74) *Attorney, Agent, or Firm* — Sterne, Kessler, Goldstein & Fox P.L.L.C.

(57) ABSTRACT

Disclosed herein are system, method, and computer program product embodiments for utilizing non-RAM memory to implement calculating a first wind metric over a geographic area, wherein the first wind metric reflects total wind velocity vector differences. The method further calculates a second wind metric over the geographic area, wherein the second wind metric reflects a horizontal wind gradient near obstacles. The method further generates a first data set of the first wind metric and a second data set of the second wind metric and combines the first data set and the second data set into a combined data set representing a combination of the first wind metric and the second wind metric. The combined data set represents wind hazards in an urban environment with buildings and is used to identify or generate low altitude flighted vehicle navigation paths for urban flighted vehicles, such as drones or air taxis.

16 Claims, 10 Drawing Sheets

(56) References Cited

U.S. PATENT DOCUMENTS

| | | | |
|---|---|---|---|
| 6,500,459 B1 | 12/2002 | Chhabra et al. | |
| 8,131,407 B1* | 3/2012 | Robinson | G01C 23/00 |
| | | | 701/14 |
| 11,030,906 B2* | 6/2021 | Hendrian | G08G 5/0021 |
| 11,046,430 B1 | 6/2021 | Melton et al. | |
| 11,163,319 B2 | 11/2021 | Tuukanen et al. | |
| 11,217,104 B2 | 1/2022 | Ivanov et al. | |
| 2002/0044968 A1 | 4/2002 | Van Lengerich | |
| 2002/0077364 A1 | 6/2002 | Murari et al. | |
| 2003/0021841 A1 | 1/2003 | Matharu et al. | |
| 2003/0050344 A1 | 3/2003 | Garavani et al. | |
| 2003/0119911 A1 | 6/2003 | Franz et al. | |
| 2003/0198667 A1 | 10/2003 | Franz et al. | |
| 2004/0087483 A1 | 5/2004 | Piccariello et al. | |
| 2004/0219218 A1 | 11/2004 | Martino et al. | |
| 2005/0059574 A1 | 3/2005 | Klein et al. | |
| 2005/0176829 A1 | 8/2005 | Klein et al. | |
| 2007/0236367 A1* | 10/2007 | Matayoshi | G01S 17/95 |
| | | | 340/973 |
| 2013/0314694 A1* | 11/2013 | Tchoryk, Jr. | G01S 17/58 |
| | | | 356/28.5 |
| 2020/0117220 A1* | 4/2020 | Paglieroni | G05D 1/104 |
| 2021/0319705 A1* | 10/2021 | Furumoto | G08G 5/0091 |
| 2022/0065983 A1* | 3/2022 | Ruzanski | G01S 7/023 |
| 2022/0341753 A1* | 10/2022 | Wang | G01C 21/20 |
| 2023/0196928 A1* | 6/2023 | Pietarinen | G06T 11/206 |
| | | | 701/14 |
| 2023/0306857 A1* | 9/2023 | Hayakawa | G01C 21/20 |
| 2024/0054902 A1* | 2/2024 | Kawaguchi | G01C 21/20 |

* cited by examiner

MICROSCALE WEATHER HAZARD PRODUCTS FOR URBAN AVIATION TRANSPORTATION

BACKGROUND

Prior efforts for deriving wind hazards from meteorological data have focused on shear or mechanical turbulence and were described chiefly as meteorological threats. Lacking is a recognition of individual wind components in a vicinity of obstacles, such as buildings in an urban environment.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof for generating microscale weather hazard components for urban aviation transportation.

In some embodiments, the technology described herein implements an approach for translating horizontal and vertical wind measurements (physically observed or simulated), in an urban environment, into potential wind hazard metrics and guidance for drone (guided or autonomous) and urban air taxi or other urban advanced air mobility operations. The developed hazard measures focus on a plurality of different wind constraints associated with instantaneous turbulence ("Shake") and identification of strong wind gradients, in short distances, in the vicinity of buildings and obstacles ("Sharp").

In one exemplary embodiment, the technology described herein implements a GUI implementation focused on segregating key hazard translations from three dimensional (3D) wind data and maintaining and representing an operational perspective as its exists due to proximity to obstacles and infrastructures in the operating domain (e.g., urban environment).

In some embodiments, the Shake and Sharp data are combined. In some embodiments, the Shake and Sharp are individually visualized (displayed) as an overlay on a geographic area, cleaned and then combined into a visual graphic identifying gradients of the combined data sets. In some embodiments, the combined data sets are visualized via a common, normalized multi-level severity matrix scale.

In one exemplary embodiment, the technology described herein implements a specific GUI implementation grid mapping of urban wind velocities and navigation pathways for urban drone or air taxi flight planning, in general.

One benefit of the technology described herein is that it may be implemented by various organizations to better assess and identify urban areas well-suited vs. hazardous for urban aviation. Commercial drone, air mobility vehicle developers, mission planners, government regulators and city/airspace planning organizations and service providers may all make use of this technology for a spectrum of hazard planning and improved awareness. For example, the technology may be used for longer-term strategic development and testing to near-real-time mission execution that ensures urban weather hazard avoidance. Additionally, companies providing or in need of Uncrewed Aviation System (UAS) and Air Mobility pilot and mission planning may make use of this technology to represent accountability and injection of urban weather hazards as part of training preparedness. In one non-limiting example embodiment, mobile devices may use the grid mapping of urban wind hazards overlaid onto a digital map of a potential delivery area.

Figure 1A:
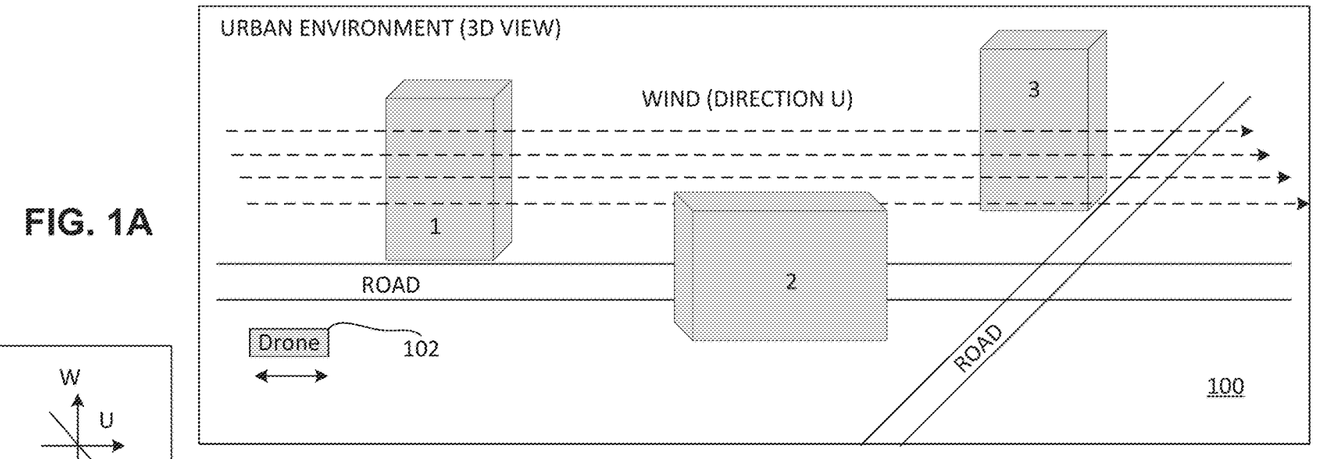
FIG. 1A and FIG. 1B collectively illustrate an example urban environment, according to some embodiments.
Figure 1B:
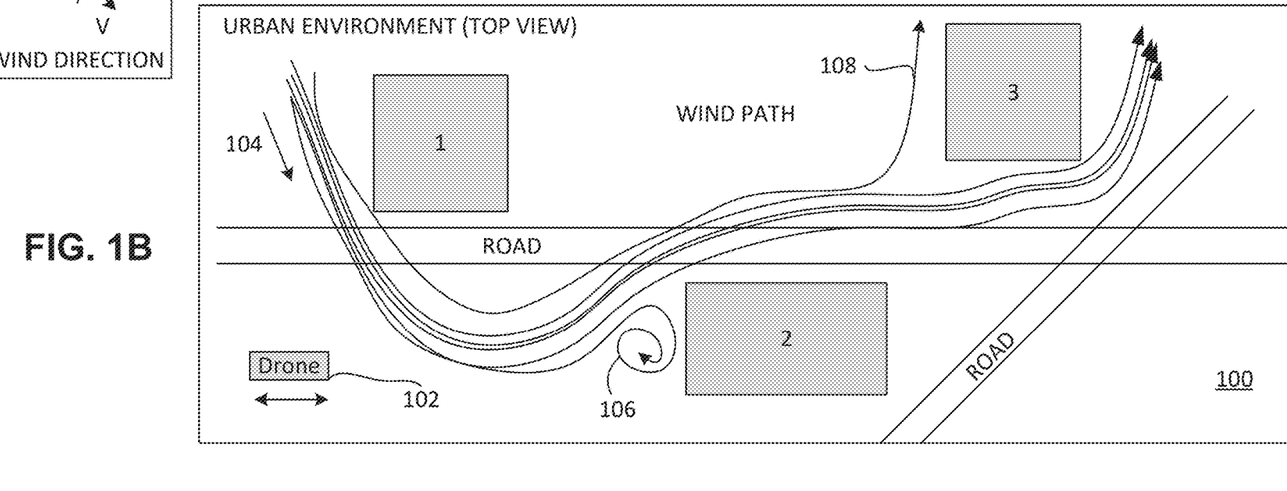
Figure 2A:
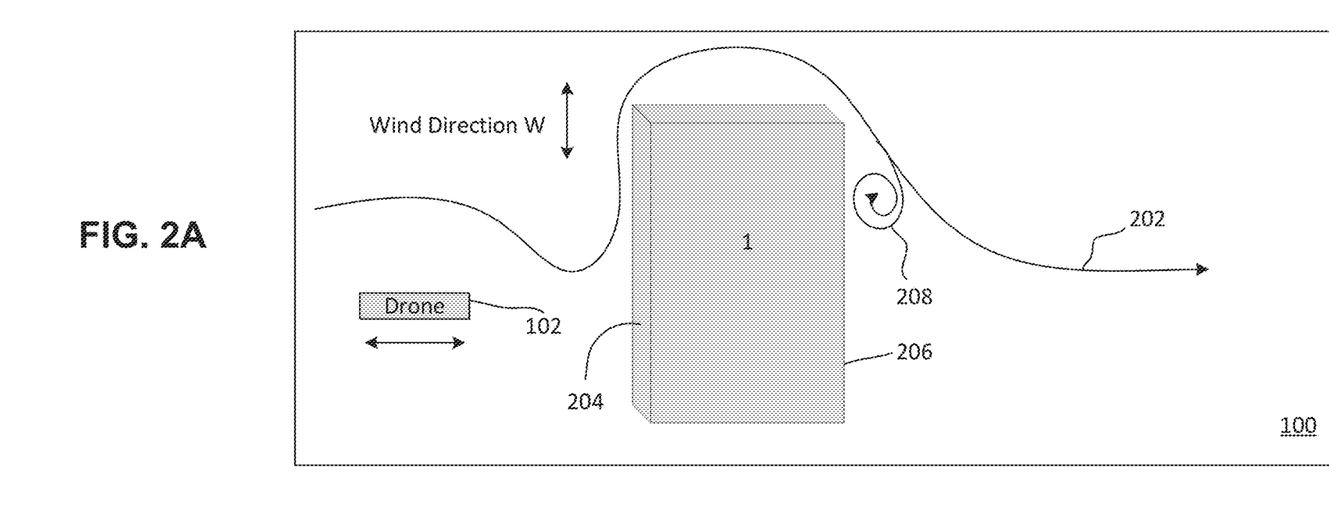
FIG. 2A and FIG. 2B collectively illustrate winds directions in an example urban environment, according to some embodiments.
Figure 2B:
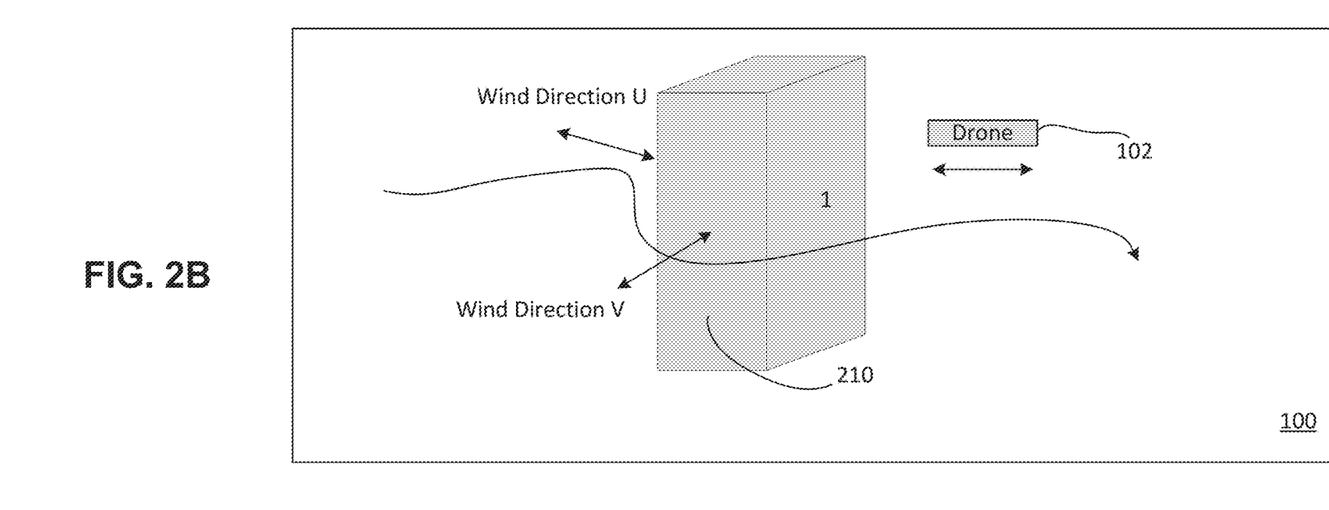

FIG. 1A and FIG. 1B collectively illustrate an example urban environment, as per some embodiments. In a non-limiting example embodiment, the technology described herein will be implemented to assist flight path determination for urban flighted vehicles, such as drones. When attempting to navigate an urban environment, winds may negatively influence the urban flighted vehicles based on currents in multiple directions and in differing velocities. For example, severe wind hazards, in and around buildings, may prevent low flight path air vehicles to operate safely. In some embodiments, the technology described herein recognizes these winds (real or simulated) and subsequently generates a graphical wind map that reflects multiple wind measurements and accompanied thresholds for when these wind measurements may prove hazardous. The wind hazard translations can be tuned and refined as needed both to better represent wind condition uncertainty (given underlying probabilistic calculations included in technology) or as hazard thresholds may vary for different vehicle or mission types. FIG. 2A and FIG. 2B illustrate examples of additional wind directions, for the same urban environment 100 example as shown in FIG. 1A and FIG. 1B.

Turbulence or turbulent flow is fluid motion characterized by chaotic changes in pressure and flow velocity. It is in contrast to a laminar flow, which occurs when a fluid flows in parallel layers, with no disruption between those layers. Wind shear (or windshear), sometimes referred to as a wind gradient, is a difference in wind speed and/or direction over a relatively short distance in the atmosphere. Atmospheric wind shear is normally described as either vertical or horizontal wind shear. Vertical wind shear is a change in wind speed or direction with a change in altitude. Horizontal wind shear is a change in wind speed with a change in lateral position for a given altitude. Wind shear may have significant effects on the control of an aircraft, especially in close proximity to buildings or other objects that may influence one or more wind components.

In some embodiments, the technology described implements calculating and combining "total wind velocity vector differences" with "time-averaged horizontal wind gradients". For example, an urban geography may be segmented into microscale wind vectors for a grid of cells. The mapping may be implemented by combining various wind factors, such as, when a magnitude of a total wind velocity vector difference exceeds a threshold and when a time-averaged horizontal wind gradient maximum value exceeds a threshold around buildings or obstacles. In some embodiments, a GUI reporting mechanism may be implemented as a 3-level severity matrix showing merged wind hazards. In some exemplary embodiments, the GUI reporting mechanism may be used to improve drone or air taxi flight planning in an urban environment.

Unmanned aircraft system Traffic Management (UTM) is an air traffic management ecosystem for autonomously controlled operations of UAS by the Federal Aviation Agency (FAA), National Aeronautics and Space Administration (NASA), other federal partner agencies, and industry. In some embodiments, the technology described herein implements a supporting framework to enable multiple UAS operations beyond visual line-of-sight at altitudes under 400 meters above ground level in airspace where FAA air traffic services are not provided. Additionally, companies providing or in need of UAS and Air Mobility pilot and mission planning or execution planning may make use of this technology to represent accountability and injection of urban weather hazards as part of training preparedness.

As shown in FIG. 1A, an urban environment 100, shown in three-dimensions (3D), includes example buildings 1, 2 and 3. The number, sizing and placement of these buildings is for illustration purposes only. Any urban environment real or simulated may be substituted without departing from the scope of the technology described herein. Wind in direction U flows substantially in a parallel with the ground. As this wind interacts with obstacles, such as buildings, it may change direction and velocity. A drone 102 may look to navigate within this urban environment and may be influenced by winds (direction U) that may provide push or provide resistance to a chosen flight path. Flying in a path that incurs positive winds will increase the velocity of the drone. Flying in a path that incurs negative winds will reduce the velocity of the drone, or require additional power to maintain the existing velocity.

As shown in FIG. 1B, as wind currents or streams traverse the urban environment, they are influenced by objects within their path. The example wind path 104 follows a path around buildings 1, 2 and 3 that may include one or more changes in direction of one or more streams of the wind. For example, as the wind approaches a corner of building 2 it may incur a split of air flows, eddies, or swirls. When the wind encounters a solid object, a whirl of air (called an eddy) 106 may form off a leeward side of the object. Eddies can form near the surface (e.g., near the face of building) or aloft, and the size and shape of the eddy depend on the speed of the wind, combined with the size and shape of the object. In another example, as the wind approaches a corner of building 3 it may incur a split of flows 108 and travel around the building. While not shown, this split air stream may recombine on a distal side of a building with the air streams passing on the other side of the building. While shown for simplicity of illustration, the wind of the urban environment may be constructed of an unlimited number of streams of varying velocities and directions. These streams, based on influences from buildings and other obstacles may split, recombine and change directions. In addition, changing wind streams may also have an effect on other winds streams that they encounter. While not shown, winds streams may be additionally affected by environmental factors, such as, but not limited to, temperature, land type (e.g., impervious surface, forest, grass), weather related factors (e.g., moisture content, precipitation, cloud conditions and resultant solar radiation and affected heat fluxes, air pressure, etc.), and moving objects, such as vehicles, trains, other aircraft, etc.

FIG. 2A and FIG. 2B illustrate one or more parts of the previously described urban environment 100 example from FIG. 1A and FIG. 1B. When attempting to navigate an urban environment, vertical and cross winds may also influence flight patterns of urban flighted vehicles based on currents of multiple directions and of differing velocities. In some embodiments, the technology described herein recognizes these winds (real or simulated) and subsequently generates a graphical wind map that reflects multiple wind measurements and derived, associated urban aviation hazards.

Figure 3A:
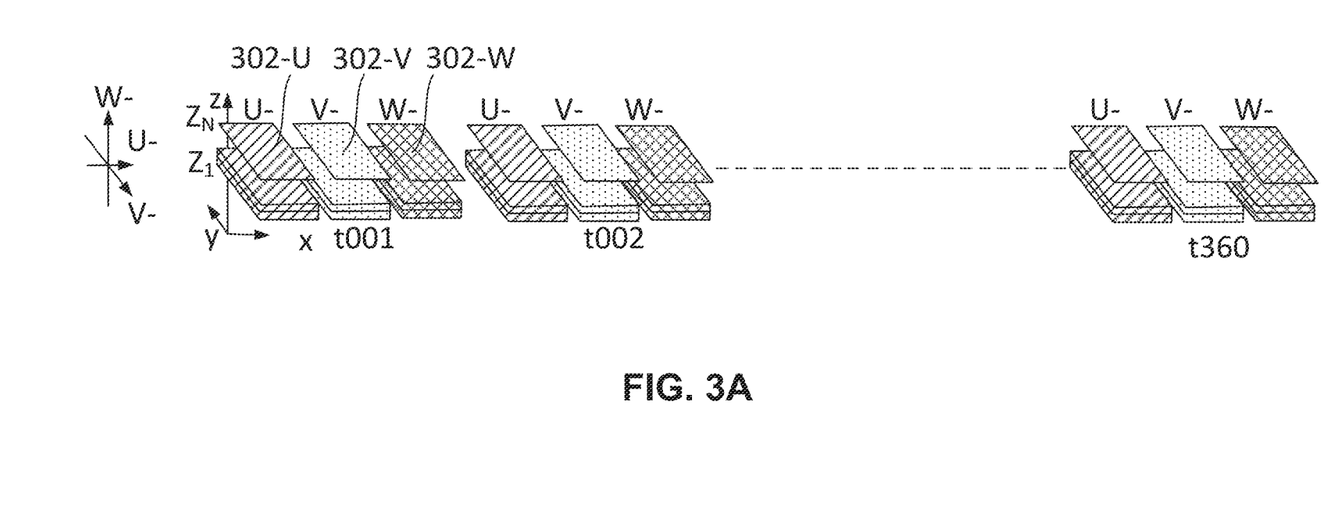
FIG. 3A and FIG. 3B collectively illustrate winds direction component calculations over time, according to some embodiments.
Figure 3B:
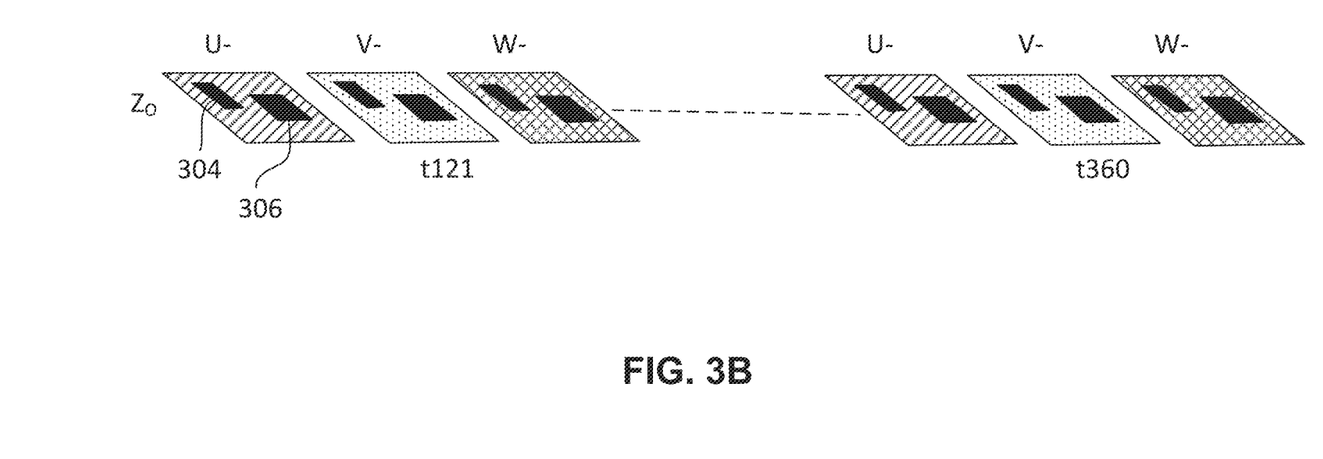

As previously described, the technology described herein implements an urban microscale wind mapping of a grid of cells. Winds may include one or more directional components, such as, parallel (U), vertical (W) and cross (V). Cross winds may be defined as orthogonal to parallel winds U. As shown and described in greater detail in FIG. 3, the technology described herein measures or monitors each these winds factors as they occur in a cell of a segmented mapping of the urban environment. In some exemplary embodiments, a GUI reporting mechanism reflects various constructs of these measurements may be of use to improve drone or air taxi flight planning in a city environment.

FIG. 2A illustrates a vertical wind W in an urban environment 100. In a non-limiting example, as winds 202 interface with a tall building (1), they become pressurized by accumulating on the face 204 of the building (1). These pressurized wind streams accelerate up the face 204 of the building (1) as they are redirected vertically in a positive W direction up a side of the building and over the top. After passing over the top of the building, the wind streams on the far side 206 may accelerate in a negative W direction (based on a distal side lower pressure cavity), resulting in a lower path on a far side of the building. In addition, similar to the description of eddy currents and swirls described in FIG. 1B, one or more eddies 208 may form on the lower pressure side 206 of the building (1).

FIG. 2B illustrates horizontal wind direction U and cross wind V in an urban environment 100. In a non-limiting example, as winds interface with a part of the building (e.g., corner or side), they may become pressurized as they accumulate and draw energy from the wind streams, accelerating and forcing the wind streams from direction U to cross direction V as they pass around the side 210 of the building (1). After passing the building, the wind streams on the far side may accelerate in a negative W direction (based on a lower pressure cavity), resulting in a return to a U path on a far side of the building. In addition, while not shown, similar to the description of eddy currents and swirls described in FIG. 1B, one or more horizontal eddies or swirls may form on the lower pressure distal side of the building (1).

While shown for illustration purposes as separate wind current directions (U, V and W), in practice, each wind stream may change direction and/or velocity in a plurality of directions, such as all three. In addition, while the above discussions are focused on describing obstacle influences to existing wind streams, each of these wind directions occur naturally and may or may not be influenced by obstacles, such as buildings, based on a distance from the obstacle. For example, winds more than X m from the buildings may not be influenced or only be partially influenced by these buildings. As will be described in greater detail, the three wind directions (U, V and W) will be measured in various wind formulation constructs over time and in each cell of a segmented map of an urban environment. While described for an urban environment, the technology described herein is not limited thereto. For example, the same technology could be used to assist in selecting navigation paths for any natural environment, such as, but not limited to, agricultural, forested, hilly, mountainous, marine, suburban or rural development areas, to name a few.

FIGS. 3A and 3B illustrate example three-dimensional (3D) wind arrays for a segmented urban environment, as per some embodiments. As previously described, winds may influence urban flighted vehicles based on currents in multiple directions and in differing velocities. In some embodiments, the technology described herein captures these winds (real or simulated), and derives associated aviation hazards, through multiple wind measurements.

The processes as described hereafter may be implemented by processing logic that can comprise hardware (e.g., circuitry, dedicated logic, programmable logic, microcode, etc.), software (e.g., instructions executing on a processing device), or a combination thereof. It is to be appreciated that not all elements may be needed to perform the disclosure provided herein. Further, some of the elements may be performed simultaneously, or in a different order than shown in FIGS. 3A and 3B, as will be understood by a person of ordinary skill in the art.

Wind direction is usually expressed in terms of the direction from which it originates. Wind speed is commonly measured by anemometers, for example using rotating cups or propellers. When a high measurement frequency is needed (such as in research applications), wind can be measured by the propagation speed of ultrasound signals. However, the specific method of measuring the wind speeds may be implemented in various approaches without departing from the scope of the technology described herein.

In an exemplary embodiment, predictive models, typically used to predict weather, may be used to extract/compute the various wind component speeds and directions. The idea of numerical weather prediction is to sample the state of the fluid at a given time and use the equations of fluid dynamics and thermodynamics to estimate the state of the fluid at some time in the future. The process of entering observation data into the model to generate initial conditions is called initialization. On land, terrain maps may be used to help model atmospheric circulations within regions in order to better depict features such as winds. Weather based observations may be irregularly spaced so that they are processed by data assimilation and objective analysis methods, which perform quality control and obtain values at locations usable by the model's mathematical algorithms. The data are then used in the model as the starting point for a forecast (e.g., simulation of future weather). A variety of methods may be implemented to gather observational data for use in numerical models without departing from the scope of the technology described herein. In addition, various known and future weather models may be substituted without departing from the scope of the technology disclosed herein.

In one non-limiting example, a selected geography (e.g., city) is segmented into multiple three-dimension (3D) high-resolution blocks (i.e., grid cells). In a non-limiting example, the cubes may be 3 meters cubed and cover a total altitude of 100 m. However, the altitude is a relative altitude with respect to ground level and may vary as the actual terrain altitude changes. For example, a flight path at 90 m above ground level may be segmented into 30 cubes for measurement. At any point where the grade of the ground level changes more or less cubes are included in the wind measurements. In another non-limiting example, measurements may cover a total relative altitude of 400 ft. above ground level in airspace where FAA air traffic services are not provided. However, the measurements may be calculated for any low altitude flight path. The measurements may also be calculated at any altitudes above 400 ft, as may be of interest to AAM applications, and for which similar 3D wind data are available.

For illustration purposes only, cells measuring wind in the U (302-U), V (302-V) and W (302-W) directions are shown in two dimensions only (i.e., flat) to allow showing a plurality of cells. However, the cells are cubed as previously described. Simulated microscale wind conditions (urban, suburban, or open terrain environment) may subsequently be measured in a multi-hour sequence of U, V, and W wind 3D arrays at multi-sec to multi-min update rates. Based on a potential flight path, altitudes of interest (e.g., height) are selected for determining wind vectors. As shown in FIG. 3B, when segmenting an urban mapping into a grid of cells, grid cells corresponding to buildings 304 and 306 are excluded for measurement. One exception may include altitudes that are above the height of any buildings in the flight path. For example, for a flight path of 100 m, all cells above buildings, but at a height less than 100 m, may be processed to determine wind conditions above these buildings. In a non-limiting example, the output is a sequence of U, V, and W values for each grid cell (e.g., a 240 cell sequence for a period of time, such as, 1-3 hours). As will be discussed in greater detail hereafter, two different wind measurement hazard components are created based on these sequences—Shake™ may represent a total wind velocity variability hazard and Sharp™ may represent a horizontal wind velocity gradient hazard. Subsequently, the dataset is trimmed by focusing on altitudes of interest, excluding grid cells corresponding to buildings (see FIG. 3B) and/or ignoring early data, as the model may become more accurate over time (e.g., after the first hour), to name a few.

While described for calculating wind hazard components using weather models, actual observed wind measurements may also be used to generate the Shake and Sharp™ hazard components. Alternatively, or in addition to, calculations using the weather models may be modified by the actual observed wind measurements. In one non-limiting embodiment, real-time measurements are captured by the flighted vehicle itself (or other flighted vehicles that traversed the path in the past), building devices, ground level measurement devices, tower measurement devices, etc. and may be used for instantaneous route adjustments or be used to modify existing model measurements for future implementations. For example, a drone that recently passed a cell near building 1 and observed a severe wind measurement in that cell, may convey that measurement to the system for an instantaneous route adjustment (i.e., avoid the severe hazard cell) of a drone following the same or similar path.

Figure 4:
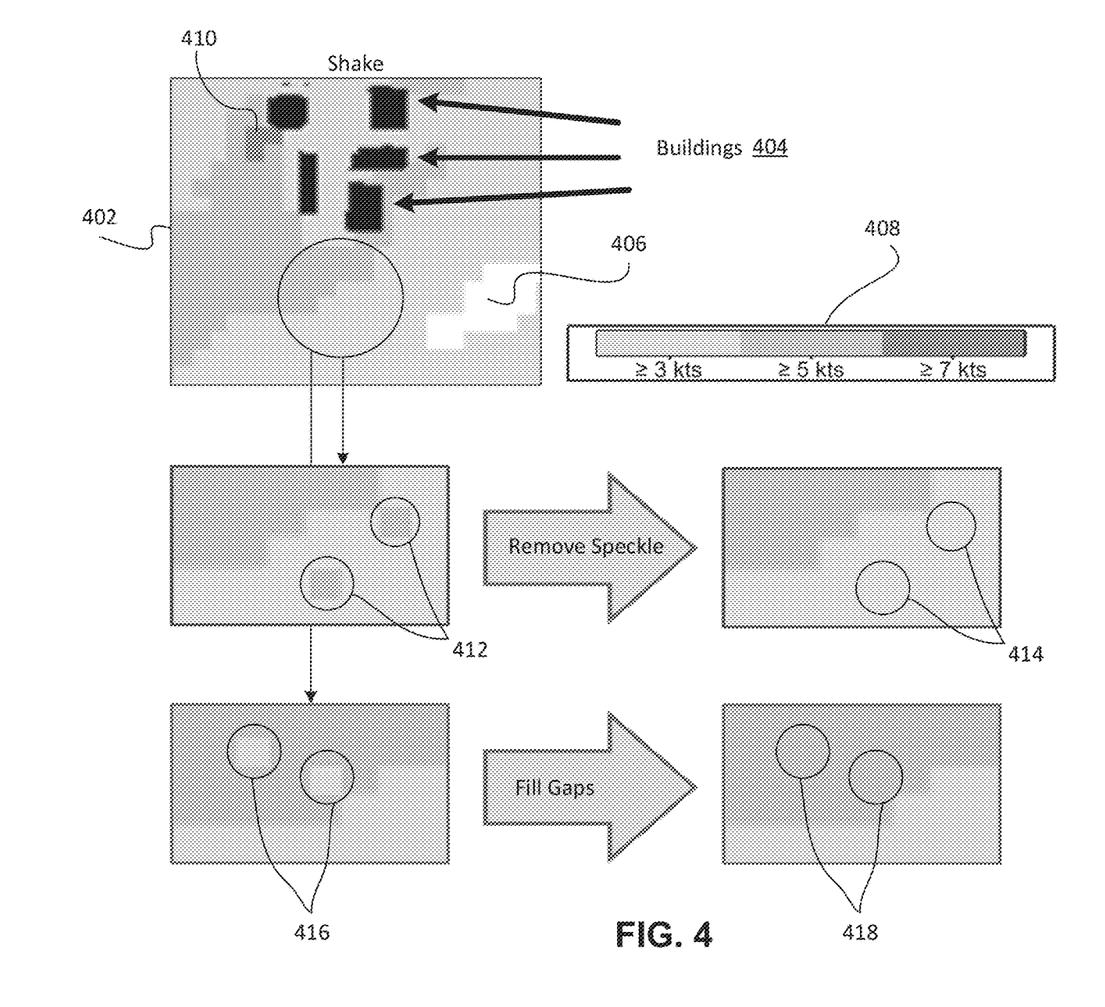
FIG. 4 illustrates a Shake graphic and data cleaning process, according to some embodiments.

FIG. 4 is an illustration of a generating a Shake component and subsequent cleaning of the data set, according to some embodiments. Generating Shake and subsequent cleaning of the data set may be implemented by processing logic that can comprise hardware (e.g., circuitry, dedicated logic, programmable logic, microcode, etc.), software (e.g., instructions executing on a processing device), or a combination thereof. It is to be appreciated that not all elements may be needed to perform the disclosure provided herein. Further, some of the elements may be performed simultaneously, or in a different order than shown in FIG. 4, as will be understood by a person of ordinary skill in the art.

In some embodiments, a Shake calculation is implemented for a map of all grid cells where the magnitude of total wind velocity vector difference between two consecutive data updates from a model exceed a given threshold with a given probability (or higher). For each grid cell, an array of all total wind velocity vector differences between consecutive model updates are calculated. Based on this array, probabilities of exceeding multiple parameterized thresholds (including probabilistic thresholds) relevant to UAS/UAM safety/performance are calculated (e.g., 0, 3, 5, or 7 knots). In some embodiments, to smooth the data, all grid cells are aggregated into 7×7 kernels. For each kernel, the $95^{th}$ percentile probability values over all grid cells in a kernel are calculated.

As shown, a Shake graphic 402 includes a visual representation of the multiple exceeded parameterized thresholds, based on probability, as measured in an urban environment, including buildings 404. The parameterized thresholds may be visualized by increasing an intensity of a color (see legend 408) or including specific colors for various degrees of severity of the Shake wind hazards. For example, a collection of cells 406 represent little or no Shake hazard, while cells 410 illustrate a probability of a severe hazard over 7 knots (1 knot equals 0.51 m/s). The specific parameterized thresholds may be set by government agencies (e.g., FAA). Original Equipment Manufacturers (OEMs) of flighted air vehicles, or be chosen based on testing metrics for each class or type of flighted vehicle. In addition, any known method may be used to identify the specific parameterized thresholds on the graphical interface.

In one embodiment, the Shake component data set may be cleaned to remove artifacts. In one example cleaning step, 'Speckle' is removed. Speckle is a small spot or patch 412 of color. If a kernel of a given color does not have any N, S, E, W neighbors of the same color, it is filled with the most dominant neighboring color that has at least one N, S, E. W neighbor. For example, a single kernel of a first color is changed to a surrounding second color 414 when it is by itself. In a second cleaning step, gaps are filled. If a one-kernel gap 416 of a given color is surrounded by 3 or 4 N, S, E, W neighbors or "higher" color, it is filled 418 with that color. The speckle and gap data set cleaning functionality may be implemented at various resolutions (e.g., number of cells) and is not limited to the one kernel implementation as described.

Figure 5:
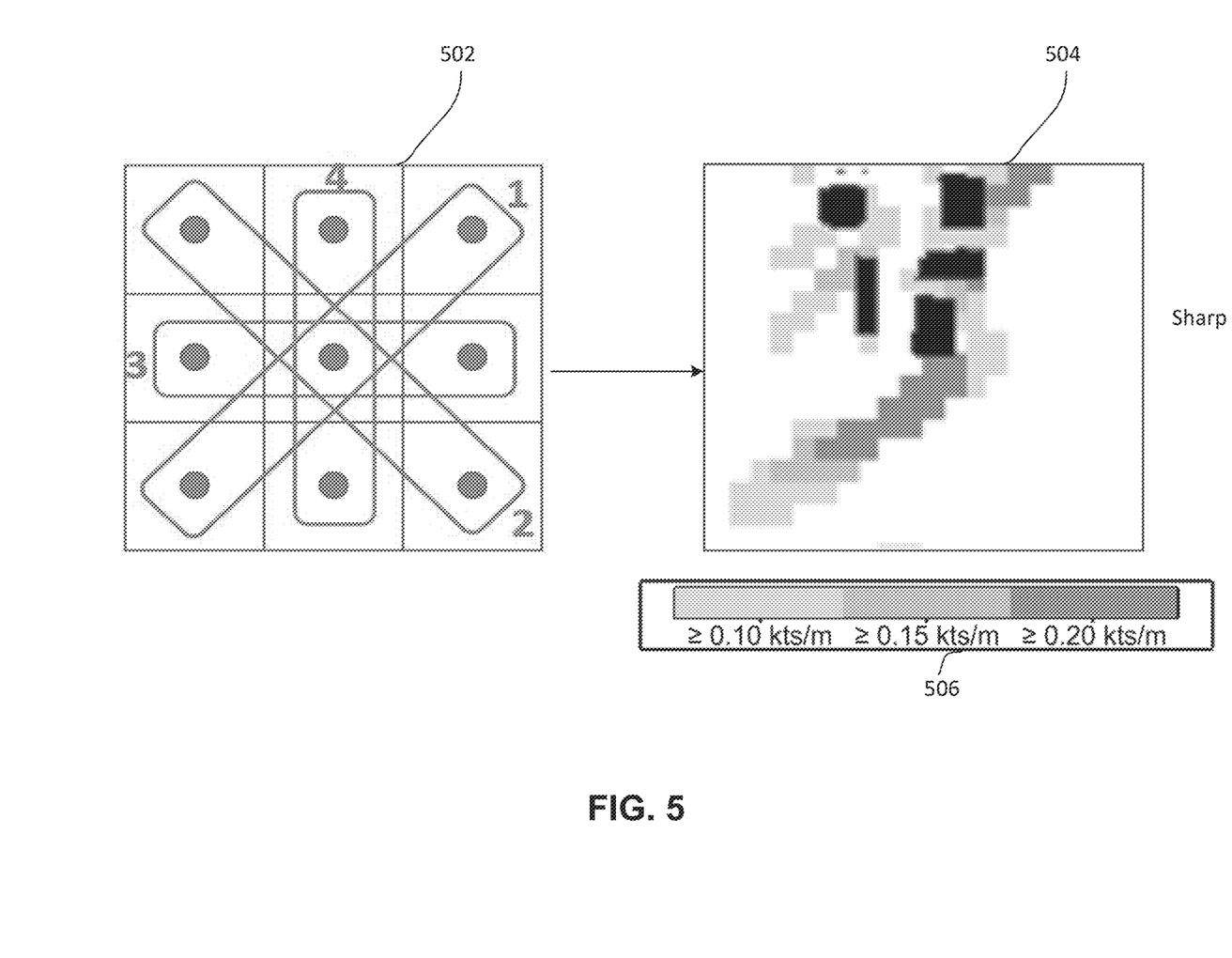
FIG. 5 illustrates generation of Sharp and graphical representation, according to some embodiments.

FIG. 5 is an illustration of a generating a Sharp component data set, according to some embodiments. Generating Sharp may be implemented by processing logic that can comprise hardware (e.g., circuitry, dedicated logic, programmable logic, microcode, etc.), software (e.g., instructions executing on a processing device), or a combination thereof. It is to be appreciated that not all elements may be needed to perform the disclosure provided herein. Further, some of the elements may be performed simultaneously, or in a different order than shown in FIG. 5, as will be understood by a person of ordinary skill in the art.

In some embodiments, a Sharp calculation is implemented for a map of all grid cells where the time-averaged horizontal wind gradient maximum value (over multiple directions) exceeds a given threshold. For each grid cell, time-averaged (E.G., over 240 values for 1-to-3 hour model data input) u- and v-horizontal wind velocities are calculated. To smooth the data, all grid cells are aggregated into 7×7 kernels. In some embodiments, for each kernel, a 3×3 group of neighboring kernels is set up. In one non-limiting example, four u- and v-velocity-based gradient values are calculated for 4 different directions 502. A total (u- and v-vector sum) gradient is calculated for each of the 4 directions. Subsequently, a maximum (out of 4) value is determined for this kernel.

In some embodiments, a Sharp calculation is implemented for a map of all grid cells where the instantaneous wind gradient maximum value (over multiple directions) exceeds a given threshold. For each grid cell, instantaneous u- and v-horizontal wind velocities are calculated. To smooth the data, all grid cells are aggregated into 7×7 kernels. In some embodiments, for each kernel, a 3×3 group of neighboring kernels is set up. In one non-limiting example, four u- and v-velocity-based gradient values are calculated for 4 different directions 502. A total (u- and v-vector sum) gradient is calculated for each of the 4 directions. Subsequently, a maximum (out of 4) value is determined for this kernel.

As with the Shake, a multiple-color map may be generated showing kernels where probabilities exceed a probability threshold of interest, for example, specific wind speed thresholds (e.g., 0.10, 0.15 and 0.20 knots) or specific probabilities (e.g., 20%, 40%, and 60%). In one non-limiting example, kernels where a probability that a parameter exceeds pre-set thresholds of interest, such as, 0.10, 0.15 and 0.20 knots (see legend 506), may be illustrated by progressively darker discrete colors on Sharp graphic 504 of an urban environment with the same buildings as shown in the Shake graphic. In a second non-limiting embodiment, exceeding a probability threshold of interest 20%, 40%, and 60% may be illustrated by progressively darker discrete colors of maximum value over the entire domain. The specific graphic highlighting may be substituted without departing from the scope of the technology described herein.

The Sharp component data set is also cleaned as described previously for Shake data set cleaning. In one cleaning step, 'Speckle' is removed. If a kernel of a given color does not have any N, S, E. W neighbors of the same color, it is filled with the most dominant neighboring color that has at least one N, S. E, W neighbor. In a second cleaning step, gaps are filled to make contiguous cell subsets. If a one-kernel gap of a given color is surrounded by 3 or 4 N. S, E, W neighbors or "higher" color, it is filled with that color.

Figure 6:
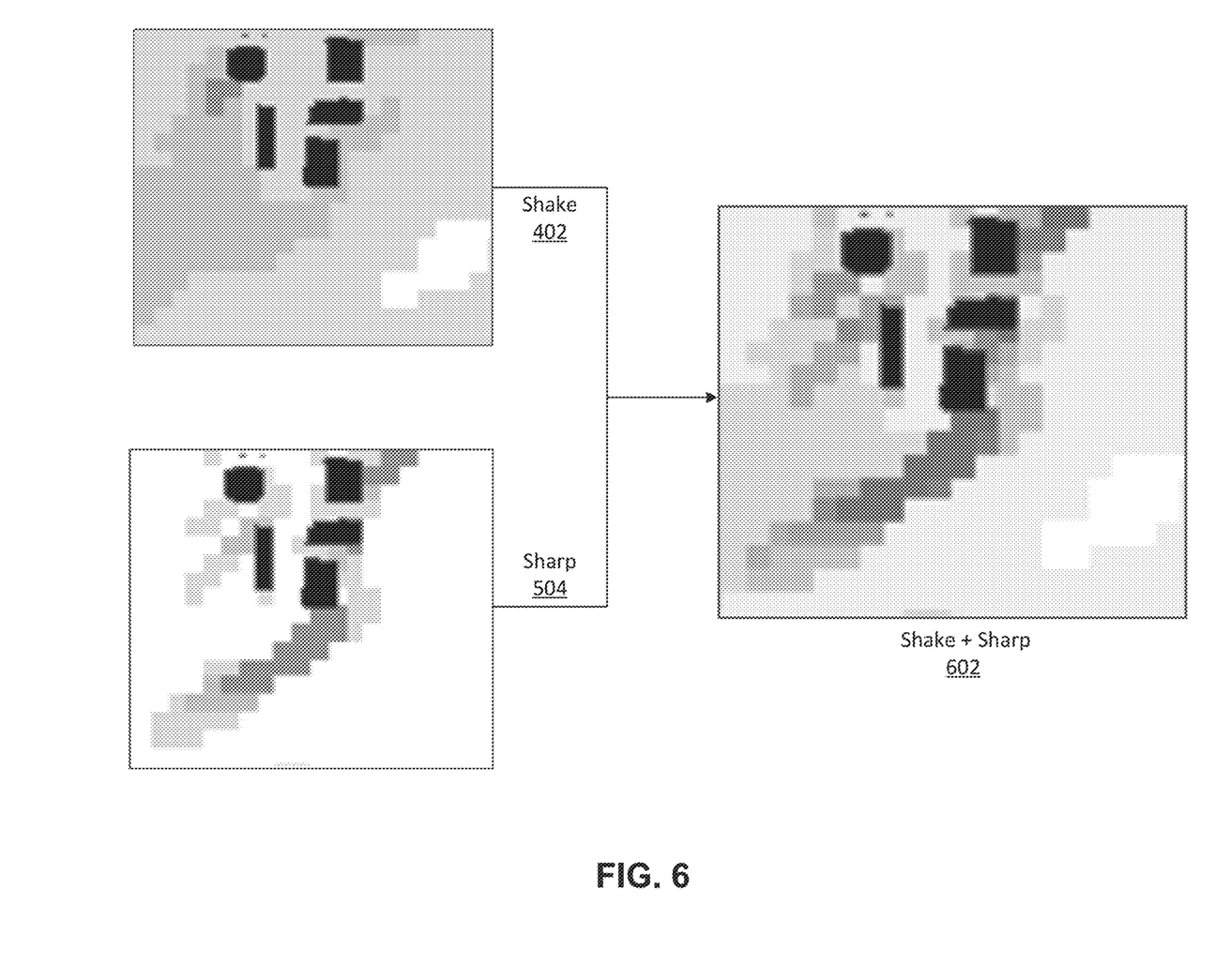
FIG. 6 illustrates combining Shake and Sharp and a graphical representation, according to some embodiments.

FIG. 6 is an illustration of a combining Shake and Sharp component data sets, according to some embodiments. Combining Shake and Sharp may be implemented by processing logic that can comprise hardware (e.g., circuitry, dedicated logic, programmable logic, microcode, etc.), software (e.g., instructions executing on a processing device), or a combination thereof. It is to be appreciated that not all elements may be needed to perform the disclosure provided herein. Further, some of the elements may be performed simultaneously, or in a different order than shown in FIG. 6, as will be understood by a person of ordinary skill in the art.

Figure 7:
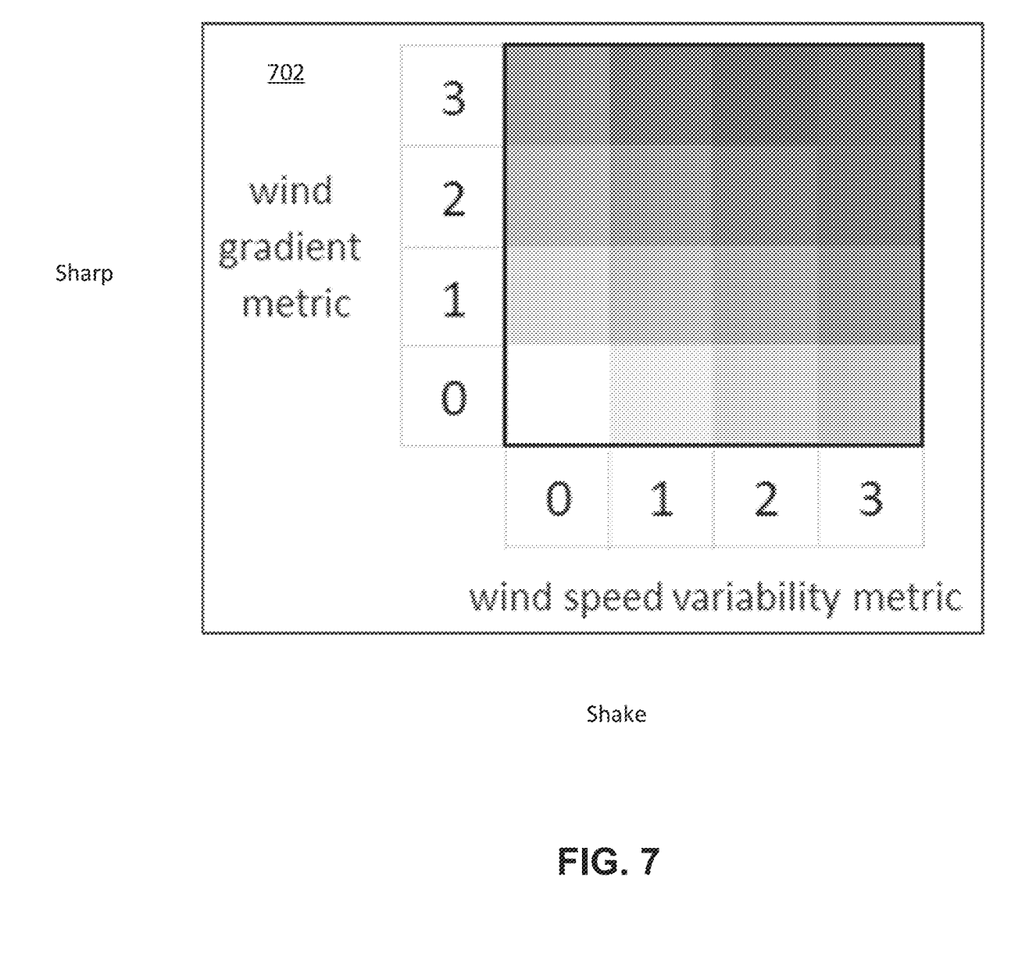
FIG. 7 illustrates a Shake and Sharp severity matrix, according to some embodiments.

In some embodiments, the Shake component and Sharp component data sets are combined. Visually, this merging 602 of a Shake graphic 402 and Sharp graphic 504 may be shown by assigning a color to each grid cell based on, for example, multiple hazard levels for the two products as shown in FIG. 7. In a non-limiting example embodiment, levels of a combined wind hazard may be expressed by a multi-level hazard severity index 702. For example, an intensity/darkness of a color may increase from left-to-right and from bottom-to-top. If more Shake wind hazard exists, a combined hazard color is reflected in a direction towards a lower right corner. If more Sharp hazard exists, the combined hazard color is reflected in a direction towards an upper left corner. High existence of both is reflected in a direction towards an upper right corner. While described for specific colors, any blending approach may be substituted without departing from the scope of the technology described herein. For example, a color blending method may be implemented, with or without a gradient realization.

Figure 8:
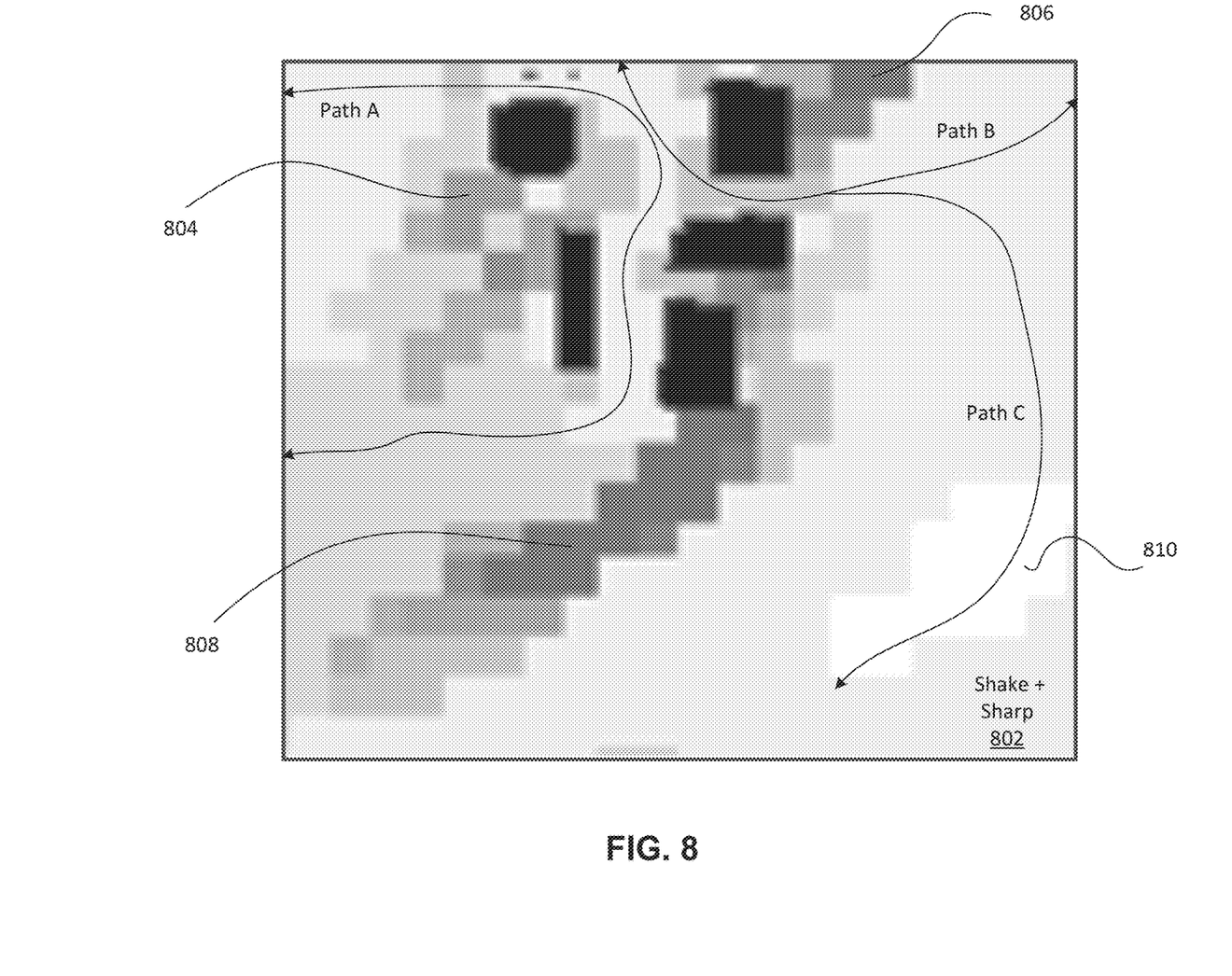
FIG. 8 illustrates generation of possible navigation paths on a combined Shake and Sharp graphical representation, according to some embodiments.

FIG. 8 illustrates a high-level graphical visualization over an operational environment, according to some embodiments. In one non-limited example, operational geography 802 represents a geography where drone traffic paths may be located. As shown, one or more flighted vehicles may traverse the urban environment using example flight paths A, B and C. Flight paths may be selected for any destination within the urban environment. Using the combined Shake and Sharp graphic interface, an optimal flight path may be selected manually (user selects a flight path from an origination to a destination using graphical interface) or automatically (system selects flight path based on the origination and destination points and the combined Shake and Sharp data sets). The optimal path may be chosen based on selecting a path with the lowest severity or average severity of wind hazards. For example, a flight path may be chosen to optimize avoidance of severe weather hazards (804, 806 and 808) as detailed by the combined Shake and Sharp data sets. Optionally, the flight path may be selected based at least partially on a shortest route combined with an optimized avoidance of severe weather hazards. Optionally, the flight path may be selected based at least partially on a shortest route as modified by avoiding cells that exceed specific chosen weather hazard levels or probabilities.

Alternatively, or in addition to, the Shake and Sharp combination data sets and/or corresponding graphics may be used by planning personnel to evaluate a specific geography (e.g., a cities, counties, states or regions) or portion of that geography (e.g., specific neighborhood, streets, blocks or addresses) for potential success or failure for flighted vehicle navigation based on predicted probabilities of wind hazards. In addition, based on the severity index, flights may be restricted to specific classes of flighted vehicles. For example, heavy air taxis may be able to handle specific wind hazard levels, while a lightweight drone may not be able to navigate in the same conditions. In some embodiments, the Shake and Sharp combination data sets and/or corresponding graphics may be used by planning personnel to evaluate an optimal location to build an air terminal for drones or air taxis. For example, as shown in FIG. 8, section 810, with little or no wind hazards, may be an optimal location to build a package delivery air terminal for drone deliveries.

Alternatively, or in addition to, the Shake and Sharp combination data sets and/or corresponding graphics may be used by planning personnel to evaluate wind hazards for specific times of day, specific seasons, weather (e.g., larger-scale wind regime, temperature ranges, etc.), and typical weather patterns.

Figure 9:
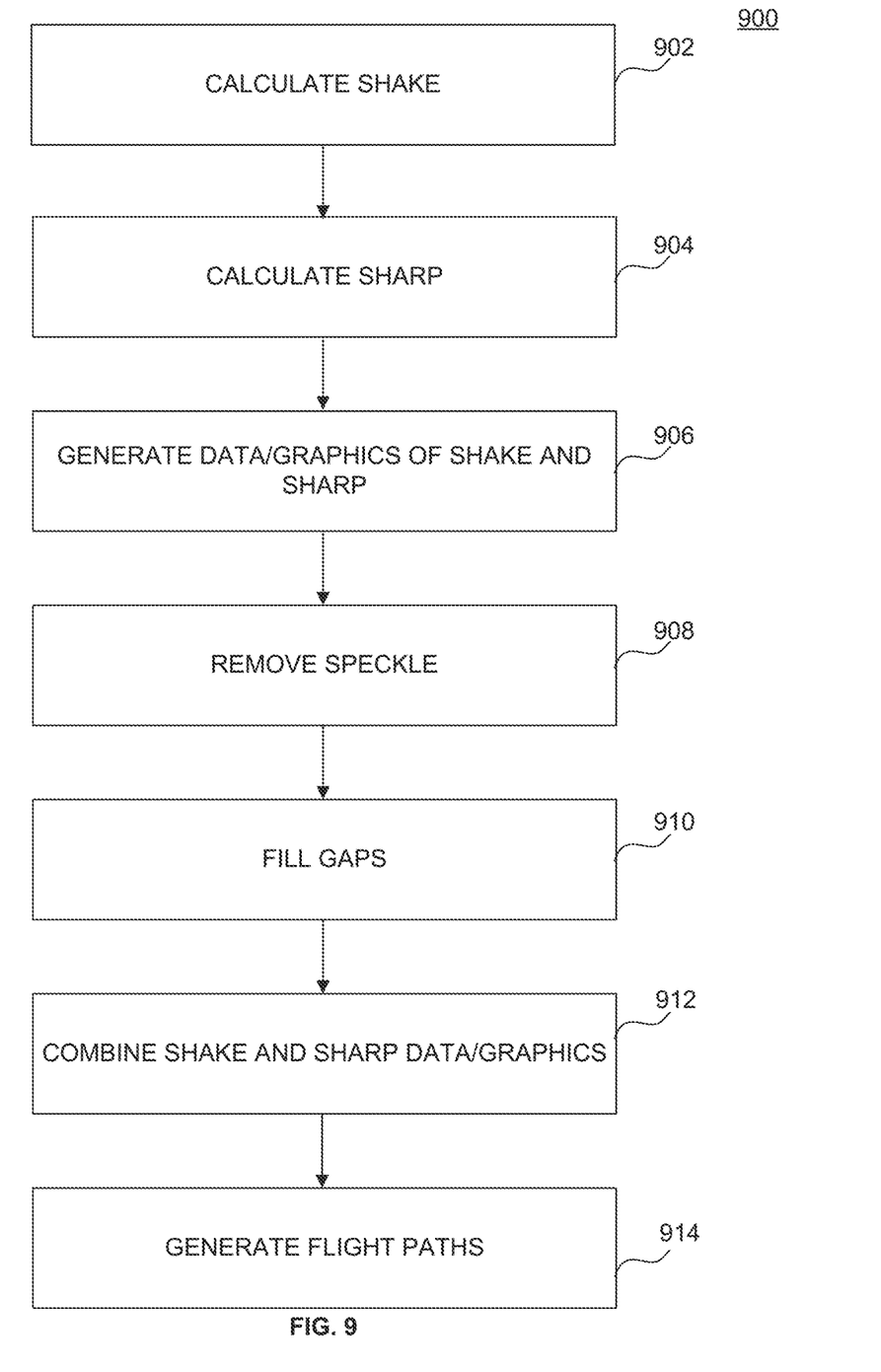
FIG. 9 illustrates a processing block diagram, according to some embodiments.

FIG. 9 is a flowchart for a method identifying weather hazard components in an urban environment, according to some embodiments. The method can be performed by processing logic that can comprise hardware (e.g., circuitry, dedicated logic, programmable logic, microcode, etc.), software (e.g., instructions executing on a processing device), or a combination thereof. It is to be appreciated that not all elements may be needed to perform the disclosure provided herein. Further, some of the elements may be performed simultaneously, or in a different order than shown in FIG. 9, as will be understood by a person of ordinary skill in the art.

In element 902, Shake is calculated. For example, a Shake calculation is generated for a map of all grid cells where a magnitude of a total wind velocity vector difference between two consecutive data updates from a model exceeds a given threshold with a given probability (or higher). For each grid cell, an array of total wind velocity vector differences between consecutive model updates may be calculated. Based on this array, probabilities of exceeding parameterized thresholds relevant to UAS/UAM safety/performance are calculated.

In 904, Sharp is calculated. For example, a Sharp calculation is generated for a map of all grid cells where the time-averaged horizontal wind gradient maximum value (over multiple directions) exceeds a given threshold. For each grid cell, time-averaged u- and v-horizontal wind velocities are calculated.

In 906, a data set for Shake and Sharp are generated by trimming the Shake and Sharp previously calculated. A graphic illustrating specific Shake and Sharp components may also be generated by graphic illustration of the data set over a selected geography. In a non-limiting example, the selected geography may match the original geography selected to calculate Shake and/or Sharp, or be a subset of the data set corresponding to a specific geographical subset of the original geography. For example, the graphic may be of a specific area or location within an urban environment. While described for urban environments, any environment for low altitude flights may be substituted without departing from the scope of the technology described herein.

In 908, speckle is removed from each of the Shake and Sharp data sets. Speckle is a small spot or patch of color. If a kernel of a given color does not have any N, S. E, W neighbors of the same color, it is filled with the most dominant neighboring color that has at least one N, S, E, W neighbor.

In 910, data gaps are filled. For example, if a one-kernel gap of a given color is surrounded by 3 or 4 N, S, E. W neighbors or "higher" color, it is filled with that color.

In 912, Shake and Sharp data sets are combined. In a non-limiting example embodiment, levels of combined Shake and Sharp may be expressed by an intensity/darkness of a color. However, the technology described herein is not limited to any specific color scheme, other highlighting schemes may be substituted without departing from the intended scope.

In 914, a flight path is selected for a destination within the urban environment. The flight path may be chosen to optimize avoidance of severe weather hazards as detailed by the combined Shake and Sharp data sets. Optionally, the flight path may be selected based at least partially on a shortest route combined with an optimized avoidance of severe weather hazards. Optionally, the flight path may be selected based at least partially on a shortest route as modified by cells that exceed specific chosen weather hazard levels.

One benefit of the technology described herein is an improvement to the computer system (computer network) visualization of weather hazards in an urban environment.

Another benefit of the technology described herein is aviation safety. The technology described herein may be used by government regulators and city/airspace planning organizations to better assess and identify urban areas well-suited vs. hazardous for urban aviation. Commercial drone, air mobility vehicle developers, mission planners and service providers could all make use of this technology for a spectrum of hazard planning and improved awareness ranging from longer-term strategic development and testing to near-real-time mission execution that ensures urban weather hazard avoidance. Additionally, companies providing or in need of UAS and Air Mobility pilot and mission planning/execution planning could make use of this technology to representative accountability and injection of urban weather hazards as part of training preparedness.

Figure 10:
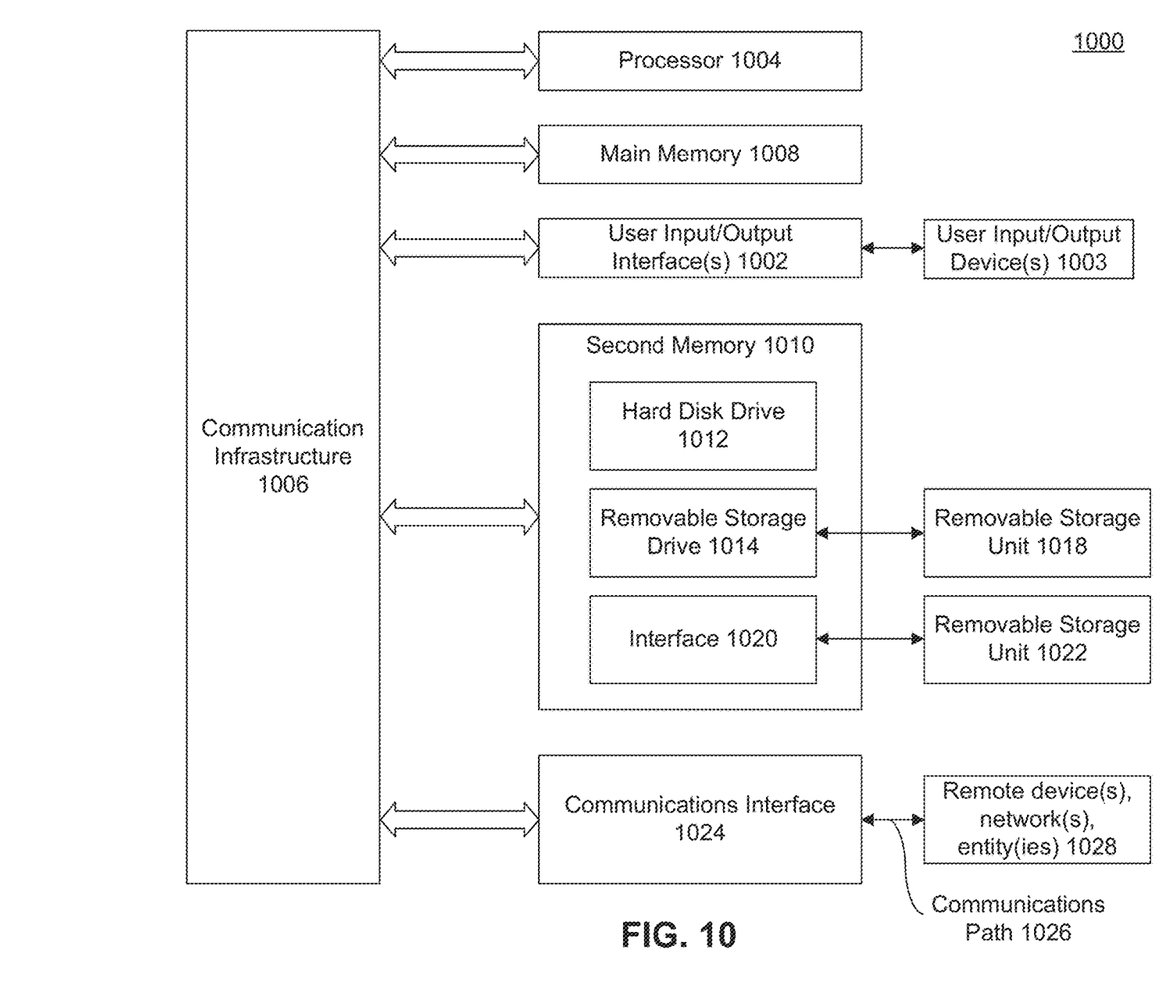
FIG. 10 is an example computer system useful for implementing various embodiments.

Various embodiments can be implemented, for example, using one or more computer systems, such as computer system 1000 shown in FIG. 10. Computer system 1000 can be any computer capable of performing the functions described herein.

Computer system 1000 includes one or more processors (also called central processing units, or CPUs), such as a processor 1004. Processor 1004 is connected to a communication infrastructure or bus 1006.

One or more processors 1004 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1000 also includes user input/output device(s) 1003, such as monitors, keyboards, pointing devices, etc., that communicate with communication infrastructure 1006 through user input/output interface(s) 1002.

Computer system 1000 also includes a main or primary memory 1008, such as random access memory (RAM). Main memory 1008 may include one or more levels of cache. Main memory 1008 has stored therein control logic (i.e., computer software) and/or data.

Computer system 1000 may also include one or more secondary storage devices or memory 1010. Secondary memory 1010 may include, for example, a hard disk drive 1012 and/or a removable storage device or drive 1014. Removable storage drive 1014 may be a floppy disk drive, a magnetic tape drive, a compact disk drive, an optical storage device, tape backup device, and/or any other storage device/drive.

Removable storage drive 1014 may interact with a removable storage unit 1018. Removable storage unit 1018 includes a computer usable or readable storage device having stored thereon computer software (control logic) and/or data. Removable storage unit 1018 may be a floppy disk, magnetic tape, compact disk, DVD, optical storage disk, and/any other computer data storage device. Removable storage drive 1014 reads from and/or writes to removable storage unit 1018 in a well-known manner.

According to an exemplary embodiment, secondary memory 1010 may include other means, instrumentalities or other approaches for allowing computer programs and/or other instructions and/or data to be accessed by computer system 1000. Such means, instrumentalities or other approaches may include, for example, a removable storage unit 1022 and an interface 1020. Examples of the removable storage unit 1022 and the interface 1020 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1000 may further include a communication or network interface 1024. Communication interface 1024 enables computer system 1000 to communicate and interact with any combination of remote devices (e.g., mobile computer devices), remote networks, remote entities, etc. (individually and collectively referenced by reference number 1028). For example, communication interface 1024 may allow computer system 1000 to communicate with remote devices 1028 over communications path 1026, which may be wired and/or wireless, and which may include any combination of LANs, WANs, the Internet, etc. Control logic and/or data may be transmitted to and from computer system 1000 via communication path 1026.

In an embodiment, a tangible, non-transitory apparatus or article of manufacture comprising a tangible, non-transitory computer useable or readable medium having control logic (software) stored thereon is also referred to herein as a computer program product or program storage device. This includes, but is not limited to, computer system 1000, main memory 1008, secondary memory 1010, and removable storage units 1018 and 1022, as well as tangible articles of manufacture embodying any combination of the foregoing. Such control logic, when executed by one or more data processing devices (such as computer system 1000), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 10. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment." or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer implemented method comprising:
    segmenting a selected geographic area into a set of three-dimensional (3D) blocks for a selected range of altitudes;
    for each of the 3D blocks in the set, calculating over a plurality of time periods, by at least one processor, a first wind metric over the selected geographic area, wherein the first wind metric reflects instantaneous turbulence;
    generating a first data set of the first wind metric based on combining a plurality of the 3D blocks into kernels, wherein each of the kernels includes a number of neighboring ones of the 3D blocks;
    for each of the 3D blocks, calculating over the plurality of time periods, by the at least one processor, a second wind metric over the selected geographic area, wherein the second wind metric reflects a horizontal wind gradient near obstacles;
    generating a second data set of the second wind metric based on the combining of the plurality of the 3D blocks into the kernels;
    combining, by the at least one processor, the first data set and the second data set into a combined data set representing a combination of the first wind metric and the second wind metric; and
    creating an overlay representation of the combined data set, wherein the overlay representation comprises a hazard severity index based on the combined data set; and
    generating a flighted vehicle navigation path based at least partially on the hazard severity index.

2. The computer implemented method of claim 1, wherein the selected geographic area is an urban environment and the obstacles comprise at least one or more buildings.

3. The computer implemented method of claim 1, wherein the overlay representation further comprises illustrating a plurality of increasing intensity colors in areas of increasing combined values of the combined data set of the first and second wind metrics.

4. The computer implemented method of claim 1, further comprising:
    generating flighted vehicle navigation path based on an origination point, a destination point and at least partially on the combined data set.

5. The computer implemented method of claim 4, wherein the flighted vehicle navigation path is generated by avoiding a flight path including one or more of the levels of severity for wind hazards based on the hazard severity index.

6. The computer implemented method of claim 1, wherein the calculating the first and second wind metrics over the selected geographic area further comprises:
    for the first wind metric, generating an array of measurements of the set of 3D blocks for total wind velocity vector differences that exceed a threshold between consecutive measurement periods;
    for the second wind metric, generating a time-averaged array or instantaneous measurement of the horizontal wind gradients near the obstacles; and
    trimming the first and second data sets based on any of:
        limiting the set of 3D blocks to the flighted vehicle navigation path; or
        removing any of the three-dimensional blocks comprising the obstacles.

7. The computer implemented method of claim 6, wherein the measuring further comprises extracting the first and second wind metrics from one or both of:
    one or more weather models;
    or physically observed winds.

8. The computer implemented method of claim 1, wherein a flighted vehicle of the flighted vehicle path comprises any of: a drone, an autonomous drone, or an air taxi.

9. The computer implemented method of claim 1, wherein the first wind metric further comprises instantaneous turbulence and the second wind metric further comprises wind gradients above a threshold, in short distances, and in a vicinity of the obstacles.

10. The computer implemented method of claim 1, further comprising:
    cleaning, by the at least one processor, the first data set and the second data set to remove data artifacts.

11. The computer implemented method of claim 1, further comprising:
    filling, by the at least one processor, data gaps in the first data set and the second data set to make contiguous data subsets.

12. A system, comprising:
    a memory; and
    at least one processor coupled to the memory and configured to:
    segment a selected geographic area into a set of three-dimensional (3D) blocks for a selected range of altitudes;
    for each of the 3D blocks, calculate over a plurality of time periods a first wind metric over the selected geographic area, wherein the first wind metric reflects total wind velocity vector differences;
    generate a first data set of the first wind metric based on combining a plurality of the 3D blocks into kernels, where each of the kernels includes a number of neighboring ones of the 3D blocks;
    for each of the 3D blocks, calculate over the plurality of time periods a second wind metric over the selected geographic area, wherein the second wind metric reflects a horizontal wind gradient near obstacles;
    generate a second data set of the second wind metric based on the combining of the plurality of the 3D blocks into the kernels;
    combine the first data set and the second data set into a combined data set representing a combination of the first wind metric and the second wind metric; and
    creating an overlay representation of the combined data set, wherein the overlay representation comprises a hazard severity index based on the combined data set; and generate a flighted vehicle navigation path based at least partially on the hazard severity index.

13. The system of claim 12, the at least one processor further configured to:
for the first wind metric, generate an array of measurements of the set of 3D blocks for total wind velocity vector differences that exceed a threshold between consecutive measurement periods;
for the second wind metric, generate a time-averaged array or instantaneous measurement of the horizontal wind gradients near the obstacles; and
trim the first and second data sets based on any of:
limiting the set of 3D blocks to the flighted vehicle navigation path; or
removing any of the three-dimensional blocks comprising the obstacles.

14. The system of claim 12, wherein the flighted vehicle navigation path is generated by avoiding a flight path including one or more of the levels of the severity index for wind hazards.

15. A non-transitory computer-readable device having instructions stored thereon that, when executed by at least one computing device, cause the at least one computing device to perform operations comprising:
segmenting a selected geographic area into a set of three-dimensional (3D) blocks for a selected range of altitudes;
for each of the 3D blocks, calculating over a plurality of time periods a first wind metric over the selected geographic area, wherein the first wind metric reflects total wind velocity vector differences;
generating a first data set of the first wind metric based on combining a plurality of the 3D blocks into kernels, wherein each of the kernels includes a number of neighboring ones of the 3D blocks;
for each of the 3D blocks, calculating over the plurality of time periods a second wind metric over the selected geographic area, wherein the second wind metric reflects a horizontal wind gradient near obstacles;
generating a second data set of the second wind metric based on the combining of the plurality of the 3D blocks into the kernels;
combining the first data set and the second data set into a combined data set representing a combination of the first wind metric and the second wind metric; and
creating an overlay representation of the combined data set, wherein the overlay representation comprises a hazard severity index based on the combined data set; and
generating a flighted vehicle navigation path based at least partially on the hazard severity index.

16. The non-transitory computer-readable device of claim 15, the operations further comprising:
for the first wind metric, generating an array of measurements of the 3D blocks for total wind velocity vector differences that exceed a threshold between consecutive measurement periods;
for the second wind metric, generating a time-averaged array or instantaneous measurement of the horizontal wind gradients near the obstacles; and
trimming the first and second data sets based on any of:
limiting the set of 3D blocks to the flighted vehicle navigation path; or
removing any of the three-dimensional blocks comprising the obstacles.

* * * * *